United States Patent Office 2,900,294
Patented Aug. 18, 1959

2,900,294

SULFAMATE RUST ERADICANTS

Joseph B. Skaptason and Johnstone S. Mackay, Pittsburgh, Pa., assignors to Pittsburgh Coke & Chemical Company, Pittsburgh, Pa., a corporation of Pennsylvania No Drawing. Application December 8, 1955
Serial No. 551,735

13 Claims. (Cl. 167—22)

The present invention relates to the treatment of plants and particularly to the treatment of wheat, oats, rye, barley and other cereals and grasses to eliminate what is commonly known as rust.

It is therefore a primary object of the present invention to develop a new class of chemotherapeutics for the treatment of rust in wheat, oats, barley, rye and other cereals and grasses.

A further object is to develop such a chemotherapeutic which does not have an adverse effect on the milling and baking qualities of the grain.

An additional object is to develop such a therapeutic having a low phytotoxicity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that amine salts of sulfamic acid applied either as a powder or as an aqueous solution or dispersion to the plants is particularly effective to preserve the plants and especially cereals, such as wheat and oats from rust.

The sulfamates thus are not true fungicides, but act in the nature of chemotherapeutants. The amine salts of sulfamic acid are superior to the inorganic salts of sulfamic acid in several ways. Calcium sulfamate, for example, is effective as a rust eradicant. However, due to its phytotoxicity, it cannot be used practically for this particular purpose. The amine salts on the other hand are usually considerably less phytotoxic. Thus under identical conditions when applied to wheat, calcium sulfamate caused moderate to severe damage while ethylene diamine disulfamate, ethanolamine sulfamate, 2-amino-1-butanol sulfamate and isooctyl amine sulfamate caused no injurious effects to the plants. The amine salts at the same time showed an effectiveness at least as good as that of calcium sulfamate in controlling rust. The reduction in phytotoxicity is indeed surprising as ammonium sulfamate is even more phytotoxic than calcium sulfamate. Furthermore, calcium sulfamate ruins the milling and baking qualities of grains such as wheat and rye, for example, while the amine sulfamates do not impair these qualities. Additionally calcium sulfamate prevents germination which is not true for the amine sulfamates.

Various types of amine salts of sulfamic acid can be used such as the aliphatic amine, aromatic amine and heterocyclic amine salts. Similarly, there can be used primary, secondary and tertiary amine salts. For example, there can be used the salts of sulfamic acid with paraffinic amines including alkyl amines having an alkyl chain of 1 to 18 carbon atoms or even higher such as mono methyl amine, dimethyl amine, trimethyl amine, triethyl amine, mono methyl diethyl amine, iso-octyl amine, n-octyl amine, n-butyl amine, tert. butyl amine, sec. butyl amine, n-amyl amine, stearyl amine; alkylene polyamines such as ethylene diamine (both the mono and disulfamate), propylene diamine (both the mono and disulfamate), diethylene triamine (both the mono and disulfamate), tetraethylene pentamine (both the mono and disulfamate); aralkylamines, e.g., benzylamine; alkenyl amine such as allylamine and oleylamine; substituted paraffinic amines such as the alkanolamines, e.g., monoethanolamine, diethanolamine, triethanol amine, propanolamine, 2-amino-2-methyl propanol, 2-aminobutanol, isopropanol amine, octanolamine; aminoethyl ethanolamine, alkoxyamines; e.g., 3-methoxypropyl amine, 3-ethoxy propylamine; haloalkylamines, e.g., chloroethylamine, 2-chloropropylamine, 4-chlorobutyl amine, 2-bromopropyl amine; imino diacetonitrile; aromatic amines such as aniline, o-toluidine, p-toluidine, m-toluidine; 2,4-xylidine, N-methyl aniline, N,N-diethyl aniline, phenylene diamine (both mono and disulfamates), α naphthylamine, B naphthylamine; heterocyclic amines, more especially heterocyclic amines having up to 3 hetero-atoms in which zero or 1 hetero atom is oxygen and the balance are nitrogen atoms, e.g., morpholine, pyridine, quinoline, pyrrolidine, melamine (monosulfamate and trisulfamate), alpha picoline, B-picoline, alpha picoline, 2,6-lutidine, 2,4,6-triethylmelamine, monophenyl melamine, 2,4,6-triphenyl melamine, cycloaliphatic amines, e.g., cycloalkylamines such as cyclohexylamine.

As a general rule the sulfamic acid salts of paraffin mono and diamines and the hydroxy substituted paraffin amines have been found to be most effective while at the same time exhibiting minimum phytotoxicity. However, under certain instances, other salts such as the pyridine salt has proven to be of outstanding effectiveness.

The amine salts can be applied dry with the aid of an inert diluent although they normally are applied in aqueous solution or dispersion. They can be employed in a concentration of 50 to 4000 parts per million (calculated as sulfamic acid) or even higher in aqueous solution with a concentration of 2000 p.p.m. frequently having been found preferred. Of course, the amine salts should not be used in an amount which will be phytotoxic to the plants. The aqueous solution of the amine sulfamate is generally sprayed over the field in an amount of 20–50 gallons/acre. The aqueous solution of the amine sulfamate also can be applied to the soil around the plants rather than by spraying the plants.

When the amine sulfamate is applied as a dust, e.g., mixed with talc or clay as a diluent, it should be used in an amount to give the same amount of sulfamic acid as when it is employed in the aqueous form.

For the purpose of testing the chemicals in Example 1 as rust eradicants, inoculation of the plants with rust was conducted in the following manner:

Wheat or oat seedlings were planted in 4-inch pots. Seven days after planting, i.e., the eighth day, they were inoculated with rust spore diluted at a ratio of 1:50 with talc while the plants were in an incubator at 100% relative humidity at 70° to 74° F. The rust-talc mixture was uniformly dusted over the plants which were maintained in the incubator for 24 hours after inoculation. The plants were then removed from the incubator and treated with the candidate chemical four days after inoculation with the rust spore (11 days after planting). The disease was in the plant at this time, but not visible. The candidate chemical was applied at varying dosages from 1 to 2000 p.p.m. (based on sulfamic acid) at a rate of 50 gallons per acre. Approximately seven days thereafter, notes were taken on the incidence of disease on sprayed and unsprayed plants.

Example 1

In the following table are shown some typical data indicating the effectiveness of various amine salts of sulfamic acid applied as an aqueous spray at a rate of 50 gallons per acre to wheat:

| Chemical | Percent Rust Control At— | | |
|---|---|---|---|
| | 2,000 p.p.m. | 1,000 p.p.m. | 500 p.p.m. |
| Ethylene diamine disulfamate | 100 | 80 | 55 |
| Ethylene diamine disulfamate (heated with elimination of ammonia) | 100 | 70 | 45 |
| Ethanolamine sulfamate | 100 | 100 | 90 |
| 2-Amino-1-butanol sulfamate | 100 | 100 | 80 |
| Calcium sulfamate | 95 | 90 | 55 |
| Iso octyl amine sulfamate | 95 | 75 | 50 |
| Check (untreated) | 0% control | | |

In no case in Example 1 did the amine sulfamates cause injury to the plant, although the calcium sulfamate exhibited moderate to severe phytotoxicity.

The amine sulfamates employed in Example 1 proved substantially equally effective in controlling rust in oats when applied under the conditions of Example 1.

Example 2

2-amino-1-butanol sulfamate was compared to calcium sulfamate and a check under field conditions on wheat for the control of stem rust. A single application of 1 pound per acre of each of the amine sulfamate and the calcium sulfamate was applied at a concentration of 1000 p.p.m. (based on the sulfamic acid content) when the wheat was in the dough stage. At harvest time the check showed 42% rust, calcium sulfamate-treated wheat 3% and the 2-amino-1-butanol sulfamate treated wheat 2% rust. The calcium sulfamate-treated wheat showed definite plant injury while there was no injury whatsoever from the 2-amino-1-butanol sulfamate.

Example 3

The amine sulfamates were equally effective whether the preformed salt was used or was formed in situ by addition of the free base and the acid to the spray tank. For example, ethanolamine sulfamate could be formed directly in the spray tank by adding equal molar amounts of ethanolamine and sulfamic acid to a tank containing sufficient water to give a concentration of 2000 p.p.m. of sulfamic acid. The mixture is thoroughly agitated to insure a uniform solution. Some of the amine sulfamates are new compounds and they can be formed in this manner or in any other conventional manner of forming amine sulfamates such as that shown in Salzberg Patent 2,212,171 for example. In addition to the amines previously set forth, other amines which can be employed include all of the amines recited in Salzberg, the entire disclosure of which is hereby incorporated by reference. Illustrative of such amines are cyclohexyloctylamine, benzyloctylamine, n-hexadecylamine, n-dodecylamine, etc.

Example 4

Ethylene diamine disulfamate, ethanolamine sulfamate, 2-amino-1-butanol sulfamate, iso octylamine sulfamate, pyridine sulfamate and quinoline sulfamate were prepared in the form of a dry powder containing 2½% of the amine sulfamate and 97½% of talc by weight. The mixture was dusted on wheat plants at a rate of 30 pounds per acre. In each case the mixture was effective in controlling rust. Similar results were obtained when oat plants were dusted with these mixtures. Dusting is preferably done in the evening or early morning when there is dew on the plants.

If desired, when applying the amine salts in the form of an aqueous solution, a small amount of a wetting agent can be included in the formulation. Thus there can be applied to wheat plants an aqueous mixture containing 2000 p.p.m. of ethanolamine sulfamate (calculated as sulfamic acid) and 0.1% by weight of the water present of Tween 20 (polyoxyethylene sorbitan monolaurate).

We claim:
1. A method of treating cereal grains from the group consisting of wheat, oats, barley and rye to protect them against rust injury, comprising applying an amine salt of sulfamic acid, said amine being selected from the group consisting of alkyl amines having 1 to 18 carbon atoms, ethylene diamine, propylene diamine, diethylene triamine, tetraethylene pentamine, benzyl amine, alkenyl amines having 3 to 18 carbon atoms, alkanol amines having 2 to 8 carbon atoms, methoxy propyl amine, ethoxy propyl amine, mono-chloro-alkyl amines having 2 to 4 carbon atoms, mono-bromo-propyl amine, amino diacetonitrile, aniline, toluidine, xylidine, N-methyl aniline, N,N-diethyl aniline, phenylene diamine, naphthyl amine, morpholine, pyridine, quinoline, pyrrolidine, melamine, picoline, lutidine, triethyl melamine, monophenyl melamine, triphenyl melamine and cyclohexyl amine to the growing plant in an amount effective to control rust.

2. A process according to claim 1 wherein the amine salt of sulfamic acid is employed in the form of an aqueous dispersion at a concentration of 50 to 400 p.p.m. and is applied to the plants at a rate of 20 to 50 gallons per acre.

3. The method of claim 1 wherein the plant is wheat.
4. The method of claim 1 wherein the plant is oat.
5. The method of claim 1 wherein the amine salt is an alkylamine salt.
6. The method of claim 1 wherein the amine salt is a monoalkyl amine salt.
7. The method of claim 1 wherein the amine salt is an alkanolamine salt.
8. The method of claim 1 wherein the amine salt is an alkenylamine salt.
9. The method of claim 1 wherein the amine salt is an alkylene diamine salt said alkaline group having 2 to 3 carbon atoms.
10. The method of claim 1 wherein the amine salt is diethylene triamine sulfamate.
11. A method of claim 1 wherein the amine salt is tetraethylene pentamine sulfamate.
12. The method of claim 1 wherein the amine salt is 2-amino-1-butanol sulfamate.
13. A composition suitable for combating rust in cereal grains from the group consisting of wheat, oats, barley and rye comprising the 2-amino-1-butanol salt of sulfamic acid.

References Cited in the file of this patent
UNITED STATES PATENTS

| 2,212,171 | Salzberg | Aug. 20, 1940 |
| 2,275,125 | Audrieth | Mar. 3, 1942 |

FOREIGN PATENTS

| 457,119 | Great Britain | Nov. 23, 1936 |

OTHER REFERENCES

Agr. Handbook No. 69, W.V. King, May 1954, p. 22, No. 28; p. 26, No. 177.